United States Patent [19]
Ward et al.
[11] 3,748,652
[45] July 24, 1973

[54] DISPLAY BUFFER

[75] Inventors: Raymond W. Ward, Northridge; Phillip W. Yows, Westlake Village, both of Calif.

[73] Assignee: Litton Systems, Inc., Beverly Hills, Calif.

[22] Filed: Apr. 10, 1972

[21] Appl. No.: 242,525

[52] U.S. Cl. ... 340/173 R, 340/173 RC, 340/172.5, 307/221
[51] Int. Cl. .... G11c 13/00
[58] Field of Search .... 340/173 R, 173 RC; 307/221, 223

[56] References Cited
UNITED STATES PATENTS
3,579,203 5/1971 Malmer .... 340/173 RC
3,656,122 4/1972 Pasternack .... 340/173 RC

*Primary Examiner*—Terrell W. Fears
*Attorney*—Harold E. Gillmann

[57] ABSTRACT

A display buffer is provided with a cyclic memory. Means is provided for writing data into the memory in successive regions and means is provided for reading data out in sequence. Counter means is provided to count the number of messages written into memory and the number of messages read out of memory, and inhibit means is provided to inhibit the write means if the memory becomes fully loaded. The read-out rate may be significantly different from the write-in rate so that the display buffer can accept data messages at a rate equal to computer assimilation and can display messages at a rate compatable to display rate generation.

8 Claims, 3 Drawing Figures

Patented July 24, 1973 3,748,652

2 Sheets-Sheet 1

Patented July 24, 1973 3,748,652

2 Sheets-Sheet 2

DISPLAY BUFFER

This invention relates to statistical display buffers, and particular to buffers for establishing a queue of data between a central computer and a display console.

As data loads for command and control display systems become larger, a need has developed for a new approach to the transfer of data from the central computer to the display consoles. Heretofore, consoles have been connected via common communications links to the central computer, each ocnsole containing display logic to operate on the deflection circuitry of the display device. Such a configuration requires a console speed equivalent to the computer speed. In large command and control systems, the data requirements of the system far exceed the data display requirements of the consoles and only selected data is displayed. As a result, the consoles must assimilate data at the computer rate and select some of the data for display. Hence, such consoles have required expensive display generation logic circuitry compatable to the computer data rate. The expensive logic circuitry is required even though only some of the data is actually displayed.

The present invention relates to data transfer apparatus to permit cathode ray tube deflection electronics to be independent of the computer data rate. The statistical display buffer according to the present invention provides a queue of data between the computer which is continuously refreshed by the display consoles and the CRT deflection electronics at a rate independent of the computer rate. By statistically distributing the data selected for display, the memory capacity of each display console is minimized. Hence, less complex deflection circuits in each display console are required without impairing the quality of the displayed data on the CRT.

It is an object of the present invention to provide a statistical display buffer capable of accumulating and storing display data at a rate independent of the central computer rate and for establishing a data queue for display purposes.

Another object of the present invention is to provide a statistical display buffer operable on a first-in/first-out data principle with the oldest data in the memory being available for first display.

In accordance with the present invention, a display console is provided with means responsive to a predetermined selection code for storing data from a control computer in a memory. Read-out means is provided for reading data out of the memory at a rate independent of computer speeds, and inhibit means is provided for inhibiting storage of additional data when the memory is fully loaded.

One feature of the present invention resides in the provision of overload means for advising the central computer of an overload condition in the memory.

The above and other features of this invention will be more fully understood from the following detailed description and the accompanying drawings, in which.

Figure 1:
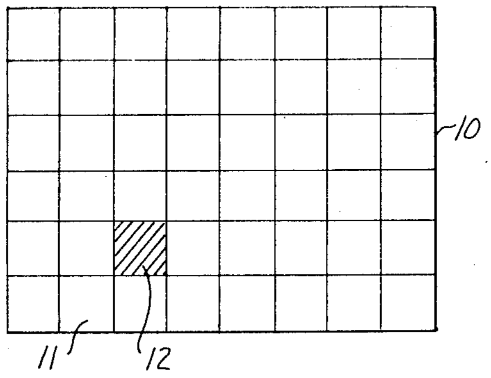
FIG. 1 is a representation illustrative of a set of data divided into sub-sets for display by individual consoles.

FIG. 1 is a representation of a set of data 10 divided into sub-sets 11, 12, the data associated with each subset to be displayed by an individual console. For example, and as one practical embodiment, set 10 may be representative of a display screen illustrative of a region which may contain aircraft, and the information to be displayed may relate to the identity, attitude, and other pertinent data of such aircraft. Set 10 may be segmented into arbitrary sub-sets 11, 12, etc., where information is to be displayed relating to aircraft in a corresponding subregion. The sets may overlap so that several consoles will display the same data, or they may be mutually exclusive. For example, information may be gathered as to the existence, identity (friend or foe), attitude and other data of aircraft in a region which is plotted into an appropraite sub-set 11, 12, etc., of the entire data scan represented by set 10.

Figure 2:
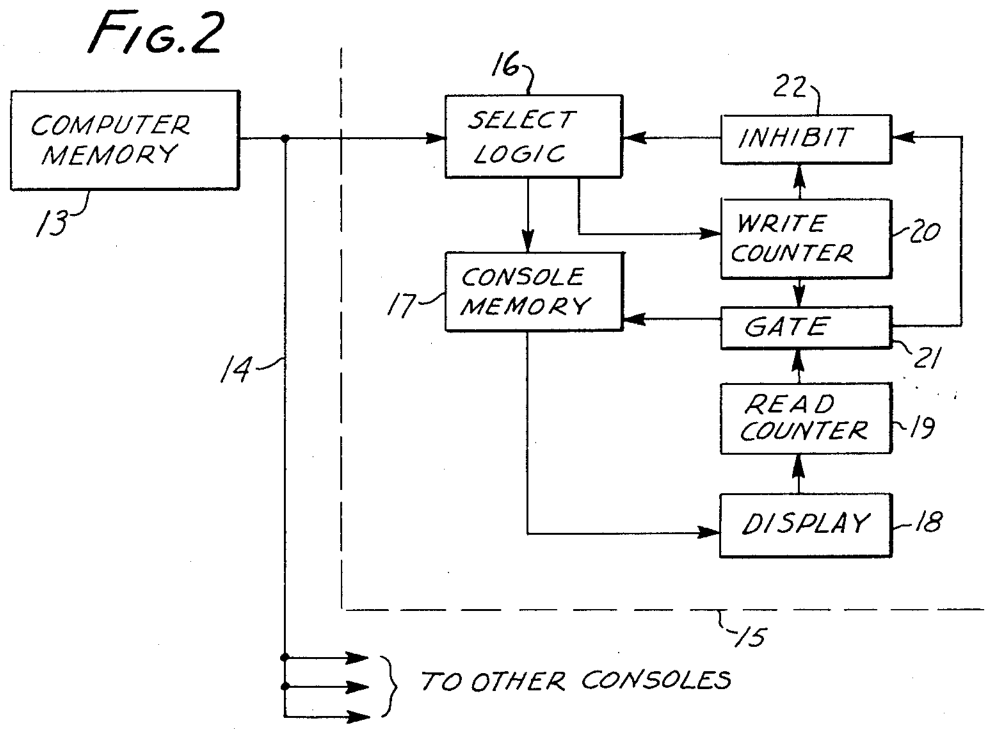
FIG. 2 is a block circuit diagram of a display buffer in accordance with the presently preferred embodiment of the present invention, which buffer is connected to a central computer.

With reference to FIG. 2, the information or data to be displayed is stored in a computer memory 13 which is connected by common communications link 14 to a plurality of consoles 15. Each separately displayable item of data is programmed into the computer with an identifying select code for a particular display console 15 associated with one of the sub-blocks 11, 12. For example, the select code may be dependent upon the locations of the particular aircraft. Communication link 14 is connected to the address logic circuitry 16 of each console 15. The address logic circuit 16 examines the address codes of each message received from computer memory 13 to determine whether the message associated with the address code is intended for the particular console. Thus, each select logic 16 passes only those data messages having an address of the particular console.

Console memory 17 is connected to the output of select logic 16 to store the data messages received from the computer. Console memory 17 is, for example, a cyclic memory, capable of operating on display 18 to cause alpha-numeric read-out of messages stored in memory 17 at a rate dependent upon a clock (not shown) associated with the memory.

Read counter 19 is connected to display 18 to count the number of messages read from console memory 17. Likewise, write counter 20 is connected to the output of select logic 16 to count the number of messages written into console memory 17. The outputs of read counter 19 and write counter 20 provide inputs to gate 21 which, in turn, provides an input to inhibit circuit 22 and to memory 17. Inhibit circuit 22 is connected to address logic 16.

In operation of the apparatus illustrated in FIG. 2, when a message is received from computer memory 13, select logic 16 examines the select code of such message and, if it is the same as the select code of the particular console, passes the message text to console memory 17. The location of storage of the data is determined by an address code supplied by gate 21. Assuming that console memory 17 is not fully loaded, in which event the input message would erase a message already stored, the information is stored in console memory 17. The read-out circuitry of console memory 17 is clocked at a rate independent of the central computer memory 13 so that information is read out on display 18 at a rate independent of the central computer memory, and at a rate capable of assimilation by the display deflection electronics.

The write-in capabilities of memory 17 is dependent upon the rate that messages are received from memory 13 for console 15. Thus, memory 17 is capable of writing data at a rate equal to the speed of computer memory 13, and is capable of reading out data at a rate dependent upon its clock (not shown). As will be more fully understood hereinafter, the write-in and read-out rates may be different.

Console memory 17 may have eight regions to store eight data messages. As each message is read into console memory 17, write counter 20 is operated to store a count indicating the region of storage, of each incoming message. As each message is read out of console memory 17, read counter 19 is operated to store a count indicating the region of storage of the next message to be displayed. Gate 21, which is connected to both counters 19 and 20, controls the read and write addresses to memory 17 to control the sequence of writing and reading data to and from memory 17. In the event that the central computer provides data which fills up all positions of console memory 17, gate circuit 21 senses the loaded condition of memory 17 from counters 19 and 20 to operate inhibit circuit 22 to inhibit select logic 16 from accepting any further messages from the central computer. Select logic 16 may transmit a signal to central computer 13 to advise the central computer that the console is loaded and cannot accept further messages. This load signal conditions the central computer to not transmit further messages to the console until removal of the load signal, such as by display of a message. When the next message in console memory 17 is displayed, read counter 19 operates on gate circuit 21 to remove the inhibit signal from select logic 16 to permit further transmission of data from central computer 13.

Figure 3:
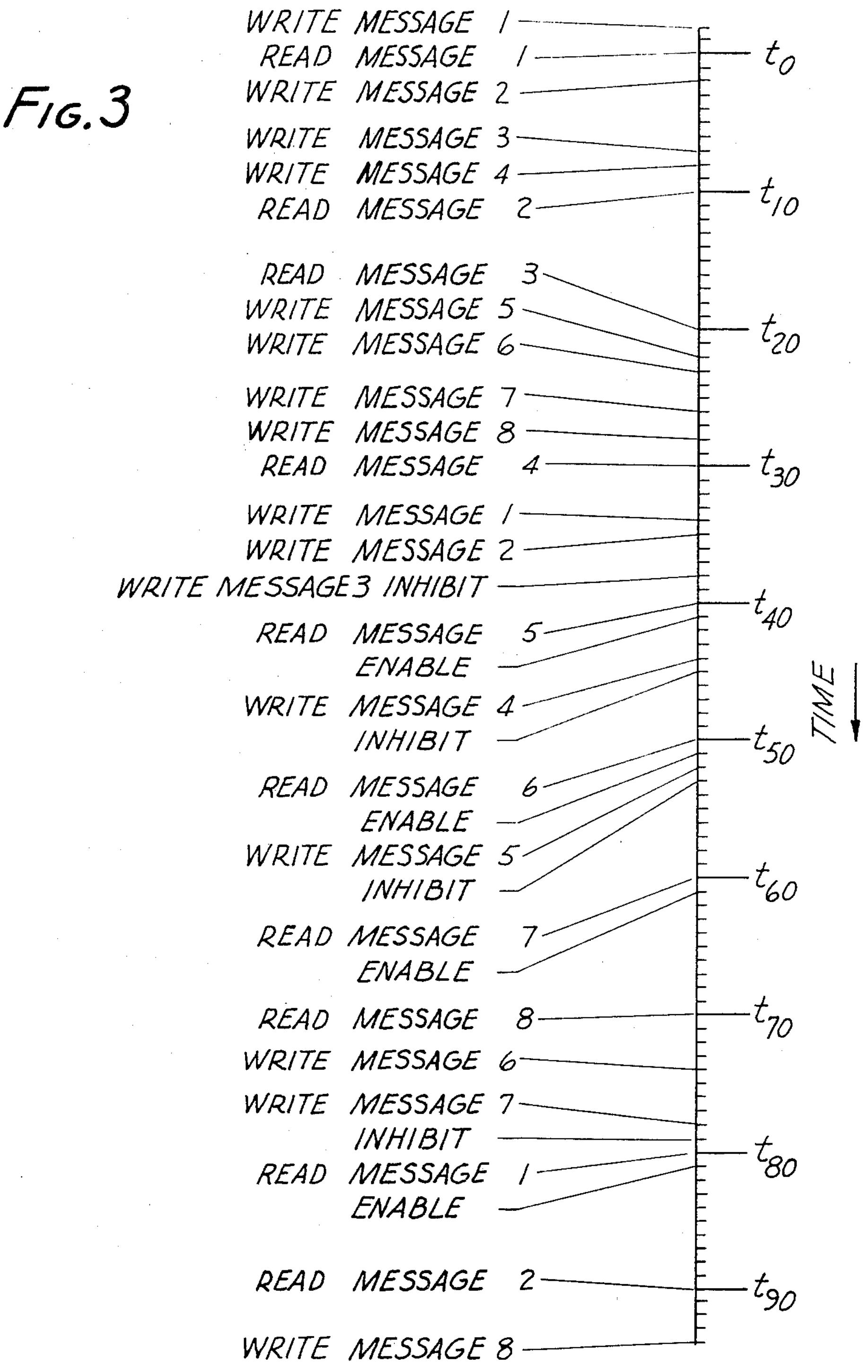
FIG. 3 illustrates an example of the operation of the display buffer illustrated in FIG. 2.

FIG. 3 illustrates an example of the operation of the apparatus shown in FIG. 2. Assume, for example, that the display rate of the console is one-tenth the data rate of the central computer and that displays may occur at times $t_{10}$, $t_{20}$, $t_{30}$, etc., while the data may be received at times $t_1$, $t_2$, $t_3$, etc. Assume further that at $t_{-2}$ a message had been received and stored in the first portion of memory 17. At $t_0$ the message in position one of memory 17 is read out. At $t_2$ a second message is received and is stored at position two of the memory, and at $t_7$ and $t_8$ messages are stored at positions three and four of the memory. At $t_{10}$ the message at position two is read out and at $t_{20}$ the message at position three is read out. At $t_{22}$, $t_{23}$, $t_{26}$, and $t_{28}$ messages are stored into positions five, six, seven and eight of the memory, and at $t_{30}$ the message at position four is read out. At $t_{34}$, $t_{35}$ and $t_{38}$ messages are read into positions one, two and three of the memory (thereby erasing previous messages stored therein, if not erased during read-out).

At time $t_{38}$, memory 17 becomes fully loaded due to the storage of a message at position three of the memory and due to the fact that the message stored at position four is being read out. As a result, read and write counters 19 and 20 are both at a count indicating a fully loaded condition of memory 17. As a result, gate 21 is operated to provide an inhibit signal to operate on inhibit circuit 22 to inhibit further messages from being read into memory 17. A load signal is sent to computer 13 to prevent further transmission of messages to the console.

At time $t_{40}$, the message at position five is displayed thereby stepping read counter 19 to the next count thereby releasing gate to release the gate signal from circuit 21 to remove the inhibit signal from inhibit circuit 22 and to remove the load signal from channel 14. As a result, memory 17 is freed to receive further messages from central computer 13. At $t_{44}$ a message is received into position four of memory 17 thereby operating gate 21 to again operate inhibit circuit 22 and to send a load signal back to central computer 13.

At time $t_{48}$, computer 13 attempts to send another message to console 15, but the load signal prevents this transmission. Hence, the message is not stored in memory 17.

At time $t_{50}$, the message at position six is displayed thereby releasing gate circuit 21 and inhibit 22 to remove the load signal from channel 14 to permit reception of a message into position five, and the process continues.

The buffer for each console provides for a queue of data between the computer and console, which queue refreshes the display consoles and the cathode ray tube deflection electronics. The data queue permits the deflection electronics to write information on the cathode ray tube at a rate which is significantly lower and independent of the computer output rate. Buffer memory 17 is sized to take advantage of the statistical distribution of the tracks selected for display to optimize the information transfer between the central computer 13 and the individual displays. Prior buffers required the ordering of data from the computer file so that no single console receives two or more consecutive tracks of data. The statistical display buffer, according to the present invention, obviates this requirement and permits the console to receive tracks of data consecutively without losing data. Statistically, the occurrance of numerous consecutive data messages for a single console would occur very rarely. However, the statistical display buffer, according to the present invention, permits the consecutive reception of data for display.

The size of console memory 17 is determined by statistical analysis and consideration of the worst case display situation. In the event of an overload condition, means (not shown) may be provided to permit the operator to logically examine the selections. For example, certain messages may be assigned a priority code to enable such messages to be forwarded to an overloaded console for the next immediate display. In addition, indicator means (not shown) may be connected to inhibit circuit 22 to indicate to the operator the overload condition of console memory 17 thereby indicating to the operator that some remedial action should be taken, such as deletion of unneeded track data or selection of a particular region of data to be analyzed.

This invention is not to be limited by the embodiment shown in the drawings and described in the description, which is given by way of example and not of limitation, but only in accordance with the scope of the appended claims.

What is claimed is:

1. In a cyclic display memory having a plurality of data storage regions and write means for writing data into successive regions in sequence and read means for extracting data from said regions in sequence, the improvement comprising: first counter means for counting in sequence the number of data messages written into said memory by said write means; second counter means for counting in sequence the number of data messages extracted from said memory by said read means; and gate means responsive to signals from said first and second counter means to provide an inhibit signal when the counts provided by said first and second counter means indicate a condition in said memory that data messages are stored in all regions of said memory which have not been extracted by said read means; and inhibit means responsive to said inhibit signal for inhibiting operation of said write means.

2. Apparatus according to claim 1 wherein said memory is connected to a central computer, and further including means responsive to said inhibit means for transmitting a message to said central computer indicative of a fully loaded condition in said memory.

3. Apparatus according to claim 2 wherein said memory has *n* regions addressed sequentially and cyclically, each of said first and second counters cyclically counting to *n*, said gate means being operable to provide said inhibit signal when the count in said first counter means equals the count in said second counter means.

4. Apparatus according to claim 1 wherein said memory has *n* regions addressed sequentially and cyclically, each of said first and second counters cyclically counting to *n*, said gate means being operable to provide said inhibit signal when the count in said first counter means equals the count in said second counter means.

5. A statistical display buffer comprising, in combination: selection means adapted to be connected to a central computer to receive data messages from said central computer, said data messages having a select code unique to an individual selection means, said selection means being responsive to the select code of each such data message to pass data messages associated with the select code of the said selection means; cyclic data storage means for storing data messages; write means for storing data messages passed by said selection means at a first rate; write counter means connected to said write means for counting the number of data messages stored in said storage means; read-out means connected to said storage means for extracting data messages from said storage means at a second rate independent of said first rate; read counter means connected to said read-out means for counting the number of data messages extracted from said storage means; and inhibit means responsive to the counts in said write and read counter means for inhibiting operation of said write means when the counts of said write and read counter means indicate that said storage means contains data messages in all regions of said storage means which have not been extracted by said read-out means.

6. Apparatus according to claim 5 further including means responsive to said inhibit means for transmitting a message to said central computer indicative of a fully loaded condition in said storage means.

7. Apparatus according to claim 6 wherein said storage means has *n* regions addressed sequentially and cyclically, each of said first and second counters cyclically counting to *n*, said gate means being operable to provide said inhibit signal when the count in said first counter means equals the count in said second counter means.

8. Apparatus according to claim 5 wherein said storage means has *n* regions addressed sequentially and cyclically, each of said first and second counters cyclically counting to *n*, said gate means being operable to provide said inhibit signal when the count in said first counter means equals the count in said second counter means.

* * * * *